(12) United States Patent
Tsuge

(10) Patent No.: US 7,211,911 B2
(45) Date of Patent: May 1, 2007

(54) AUTOMOTIVE ALTERNATOR HAVING VIBRATION-ABSORBING MEMBER DISPOSED BETWEEN REAR FRAME AND COVER MEMBER

(75) Inventor: Takafumi Tsuge, Ena (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/480,375

(22) Filed: Jul. 5, 2006

(65) Prior Publication Data

US 2007/0046135 A1 Mar. 1, 2007

(30) Foreign Application Priority Data

Aug. 23, 2005 (JP) .............................. 2005-241611

(51) Int. Cl.
*H02K 5/24* (2006.01)
(52) U.S. Cl. ........................................ 310/51; 310/239
(58) Field of Classification Search .................. 310/51, 310/238, 239, 89, 91
See application file for complete search history.

(56) References Cited

U.S. PATENT DOCUMENTS

| | | |
|---|---|---|
| 4,959,576 A | 9/1990 | Horibe et al. |
| 5,345,132 A | 9/1994 | Sasaki et al. |
| 6,294,856 B1 * | 9/2001 | Ishida et al. ................. 310/232 |

FOREIGN PATENT DOCUMENTS

| | | |
|---|---|---|
| DE | 43 27 408 A1 * | 2/1995 |
| JP | A 06-014500 | 1/1994 |
| JP | B2 07-032571 | 4/1995 |

* cited by examiner

*Primary Examiner*—Dang Le
(74) *Attorney, Agent, or Firm*—Oliff & Berridge PLC

(57) ABSTRACT

An automotive alternator includes a rear frame having a rear end wall and a cover member covering a brush device. The cover member is connected to the rear end wall of the rear frame, and a vibration-absorbing member made of a rubber material is disposed between the rear end wall and the cover member. The vibration-absorbing member has a cylindrical portion disposed between a center opening of the rear end wall and an extending portion of the cover member and a rear disc portion disposed between the rear end wall and a front surface of the cover member. The cylindrical portion is compressed in the radial direction while the rear disc portion is compressed in the axial direction, thereby alleviating vibration of the brush device in both the radial and the axial directions.

4 Claims, 3 Drawing Sheets

FRONT SIDE ←→ REAR SIDE

AUTOMOTIVE ALTERNATOR HAVING VIBRATION-ABSORBING MEMBER DISPOSED BETWEEN REAR FRAME AND COVER MEMBER

CROSS-REFERENCE TO RELATED APPLICATION

This application is based upon and claims benefit of priority of Japanese Patent Application No. 2005-241611 filed on Aug. 23, 2005, the content of which is incorporated herein by reference.

BACKGROUND OF THE INVENTION

1. Field of the Invention

The present invention relates to an alter or for an automotive vehicle, and more particularly to its improved structure around a brush holder.

2. Description of Related Art

An example of a vibration-absorbing structure in an automotive alternator is disclosed in JP-A-6-14500. In this alternator, a vibration-absorbing member is disposed, in a compressed state in the axial direction, between a front surface of a bearing box and a brush device. Although this vibration-absorbing member is able to absorb vibration in the axial direction, it is not possible to sufficiently suppress vibration of the brush device in the radial direction. On the other hand, a vibration-absorbing structure shown in FIG. 5 has been used in a conventional automotive alternator. As shown in FIG. 5, a vibration-absorbing member 201 disposed between a cover member 100 covering brushes and a rear end wall 200 of a rear frame is compressed in the axial direction. The same problem as above is involved in this structure, too. If the compressive force of the vibration-absorbing member 201 is increased by tightly connecting the cover member 100 to the rear end wall 200, vibration of the cover member 100 in the radial direction would be suppressed somewhat. However, if the connecting force is too high, the cover member 100 will be deformed, and thereby a sealing function of the brush cover 100 will be damaged.

SUMMARY OF THE INVENTION

The present invention has been made in view of the above-mentioned problem, and an object of the present invention is to provide an improved automotive alternator, in which vibration of a brush device is sufficiently suppressed without making a vibration-absorbing structure complex.

The alternator to be mounted on an automotive vehicle includes a stator, rotor rotating inside the stator, and a brush device. The brush device is covered with a cover member, and the cover member is connected to a rear end wall of the rear frame. A vibration-absorbing member made of rubber is disposed between the rear end wall and the cover member to suppress vibration of the brush device relative to the rear frame.

The vibration-absorbing member has a cylindrical portion and a rear disc portion connected to the cylindrical portion. The cylindrical portion is inserted in a cylindrical space between a center opening of the rear end wall and an extending portion of the cover member and is compressed in the cylindrical space. The rear disc portion is disposed between the rear end wall and a front surface of the cover member and is compressed there. The cylindrical portion of the vibration-absorbing member is compressed in the radial direction, while the rear disc portion is compressed in the axial direction.

Vibration of the brush device in the axial and radial directions is suppressed by the vibration-absorbing member. A front disc portion to be positioned between a rear bearing and the rear end wall may be added to the vibration-absorbing member to further alleviate the vibration in the axial direction. A reinforcing metallic member may be embedded in the front disc portion to increase its strength. An abnormal abrasion wear of the brushes can be avoided by suppressing the vibration of the brush device.

According to the present invention, vibration of the brush device relative to the rear frame in the radial and the axial directions is suppressed by disposing simple vibration-absorbing member between the rear frame and the cover member. Other objects and features of the present invention will become more readily apparent from a better understanding of the preferred embodiments described below with reference to the following drawings.

DETAILED DESCRIPTION OF THE PREFERRED EMBODIMENTS

Figure 1:
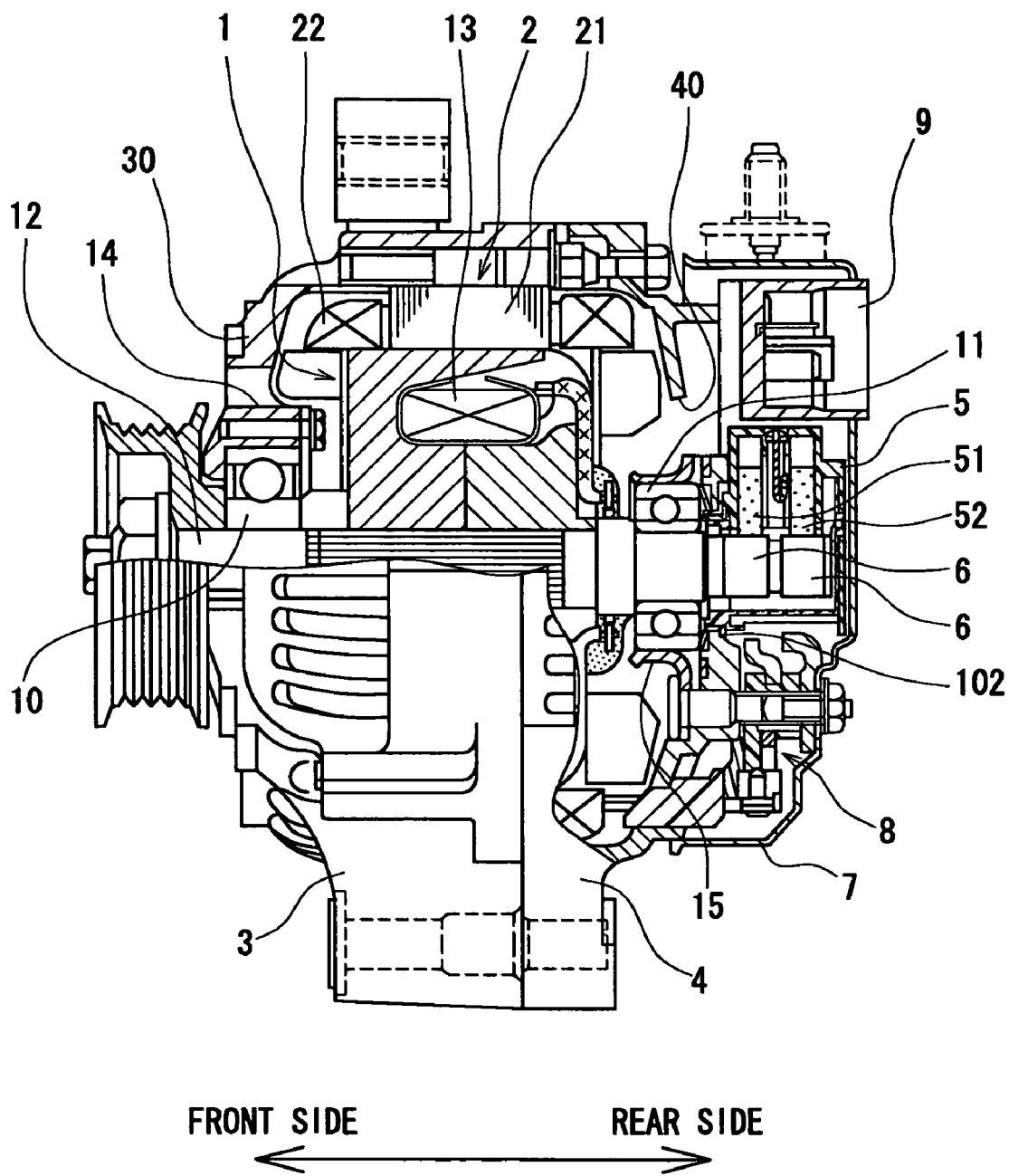
FIG. 1 is a cross-sectional view showing an automotive alternator.
Figure 2:
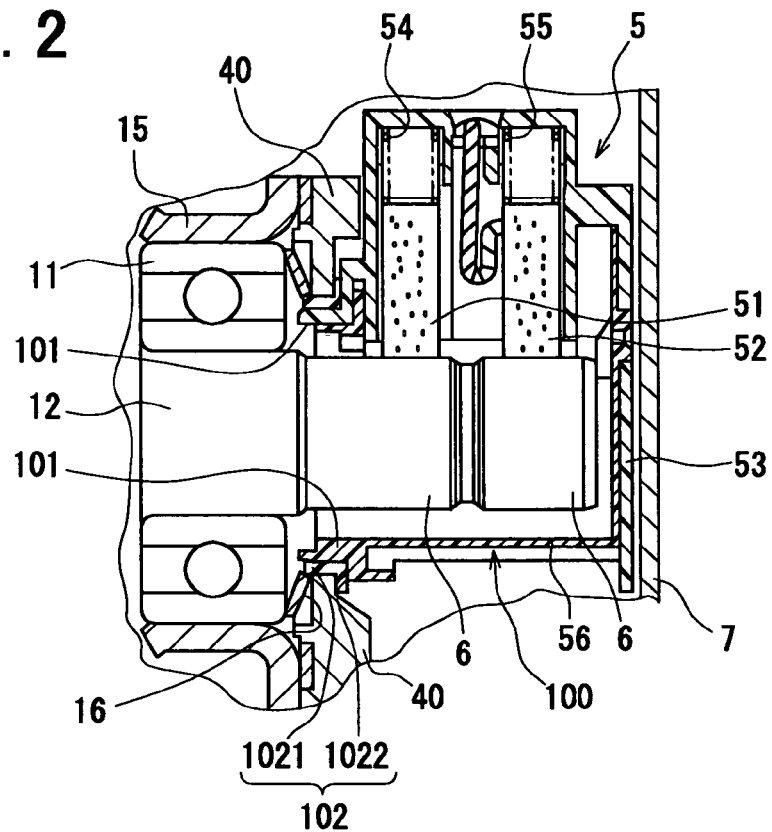
FIG. 2 is a partial cross-sectional view showing a vibration-absorbing member disposed between a rear end wall and a cover member, as a first embodiment of the present invention.

A first embodiment of the present invention will be described with reference to FIGS. 1 and 2. First, referring to FIG. 1, an entire structure of an alternator will be described. In FIG. 1, a front side and a rear side of the alternator are indicated in order to make explanation easier in the following description. The alternator includes a rotor 1, a stator 2, a front frame 3, a rear frame 4, a brush device 5, a pair of slip-rings 6, a rear cover 7, a rectifier 8 and a regulator 9. The stator 2 is composed of a cylindrical stator core 21 and a stator coil 22 disposed in the stator core 21. The stator 2 is sandwiched in the axial direction between the front frame 3 and the rear frame 4. The front frame 3 and the rear frame 4 are made of aluminum by die-casting, and both frames are connected to each other by through-bolts with the stator 2 interposed therebetween.

The rotor 1 is composed of a pair of pole cores, a field coil 13 wound around the pole cores and a rotor shaft 12. The pole cores are firmly connected to the rotor shaft 12, and the rotor shaft 12 is rotatably supported by a front bearing 10 and a rear bearing 11. The front bearing 10 is held in a front bearing box 14 formed in a front end wall 30 of the front frame 3, and the rear bearing 11 is held in a bearing box 15, made of iron, connected to the rear end wall 40 of the rear frame 4.

The pair of slip-rings 6 is formed at an rear end of the rotor shaft 12 and electrically connected to ends of the field coil 13. The rear cover 7, made of a resin material, covers the brush device 5, the rectifier 8 and the regulator 9 connected to the outside surface of the rear frame 4. The structure of the alternator and its functions will not be explained here in detail because those are well known.

The brush device 5 will be described in detail referring to FIG. 2. The brush device 5 is composed of a pair of brushes 51, 52 slidably contacting the slip-rings 6, a brush box 53 supporting and covering the brushes, a pair of springs 54, 55 pushing the brushes 51, 52 toward the slip-rings 6, and a slip ring case 56 covering the slip-rings. The brush box 53 and the slip-ring case 56 coupled to the brush box 53 constitute a cover member 100.

The rear end wall 40 of the rear frame 4 has a center opening, and the cover member 100 also has an opening facing the center opening of the rear end wall 40. The rear end of the rotor shaft 12 extends through both openings of the rear end wall 40 and the cover member 100. A portion of rear end wall 40 surrounding the center hole is positioned between the rear bearing 11 and the cover member 100, as shown in FIG. 2. A thrust washer 16 is disposed between an outer ring of the rear bearing 11 and the rear end wall 40 to push the rear bearing 11 toward the front side.

The cover member 100 includes a cylindrical portion 101 extending into the center opening of the rear end wall 40. A cylindrical space is formed between an inner bore of the center opening and the extending cylindrical portion 101. The extending cylindrical portion 101 is integrally formed with the brush box 53 and the spring case 56 by molding a resin material. A vibration-absorbing member 102 is disposed between the rear end wall 40 and the cover member 100. The vibration-absorbing member 102 is made of rubber having heat-durability, and includes a cylindrical portion 1021 and a rear disc portion 1022.

The cylindrical portion 1021 is positioned in the cylindrical space between the inner bore of the center opening of the rear end wall 40 and the extending cylindrical portion 101. The cylindrical portion 102 tightly fills the cylindrical space. The disc portion 1022 is positioned between the rear end wall 40 and a front surface of the cover member 100. The rear disc portion 1022 is compressed in the axial direction. Namely, the cylindrical portion 1021 is compressed in the radial direction while the disc portion 1022 is compressed in the axial direction. In an assembling process, the vibration-absorbing member 101 is coupled to the extending cylindrical portion 101 of the cover member 100, and then, the extending cylindrical portion 101 having the vibration-absorbing member 101 is forcibly inserted into the center opening of the rear end wall 40. In this manner, the vibration-absorbing member 102 can be correctly positioned in a compressed manner.

Vibration of the brush device 5 in the radial direction relative to the rear end wall 40 is effectively absorbed by the vibration-absorbing member 102, especially by its cylindrical portion 1021 that tightly fills the cylindrical space between the center opening of the rear end wall 40 and the extending cylindrical portion 101 of the cover member 100. An abnormal abrasion wear of the brushes 51, 52 is prevented by suppressing the vibration of the brush device 5 in the radial direction. In addition, carbon powders generated by abrasion wear of the brushes 51, 52 are prevented from entering into a motor space by the vibration-absorbing member 102. It is not necessary in this structure to push the cover member 100 toward the rear end wall 40 with an excessively high force that may cause a deformation of the cover member 100.

Figure 3:
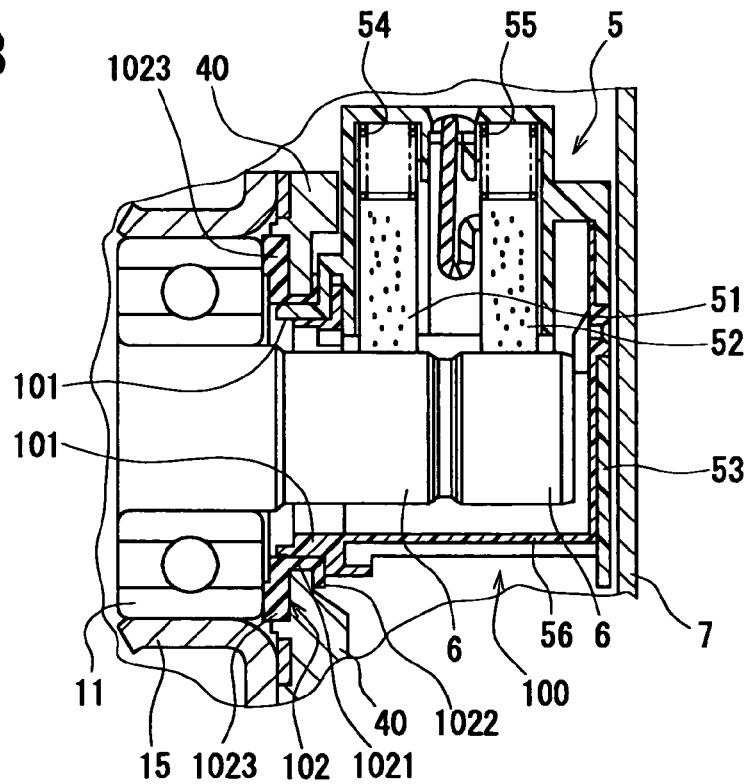
FIG. 3 is a partial cross-sectional view showing a vibration-absorbing member disposed between a rear end wall and a cover member, as a second embodiment of the present invention.

A second embodiment of the present invention will be described with reference to FIG. 3. In this embodiment, the vibration-absorbing member 102 further includes a front disc portion 1023 in addition to the cylindrical portion 1021 and the rear disc portion 1022. Other structures are the same as those of the first embodiment described above. The front disc portion 1023 is positioned between a rear end of an outer ring of the rear bearing 11 and a front surface of the rear end wall 40 and is compressed in the axial direction. In this manner, vibration of the cover member 100 in both the axial and radial directions is further suppressed. Vibration of the rotor 1 in the axial direction is also suppressed by the front disc portion 1023. In addition, the thrust washer 16 used in the first embodiment can be eliminated by replacing it with the front disc portion 1023. In an assembling process, after coupling the vibration-absorbing member 102 to the center opening of the rear end wall 40, the rear bearing box 15 is connected to the rear end wall 40. Preferably, the front disc portion 1023 is made thicker than the rear disc portion 1022 in order to provide a sufficient resiliency to replace the thrust washer 16.

Figure 4:
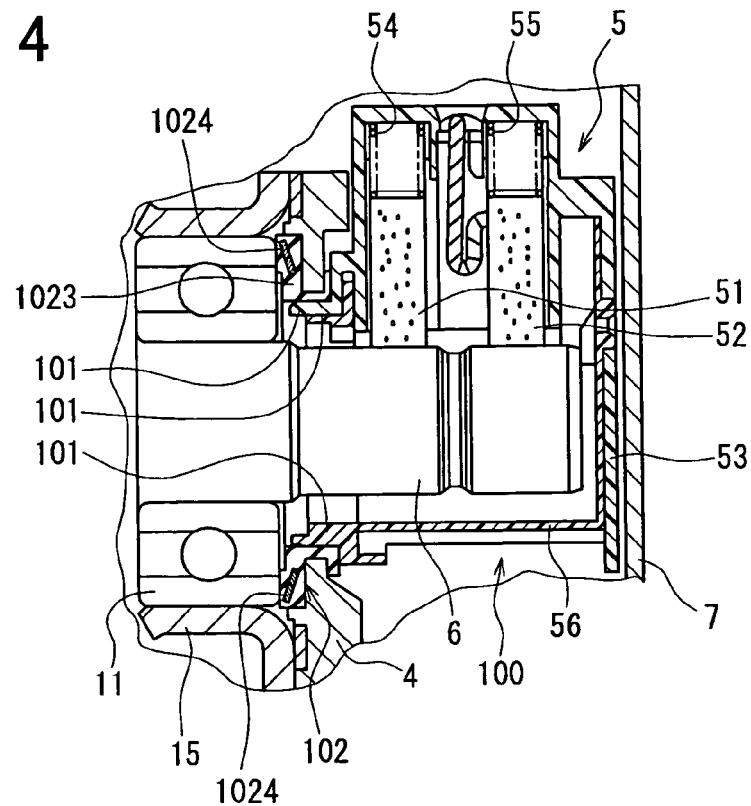
FIG. 4 is a partial cross-sectional view showing a vibration-absorbing member disposed between a rear end wall and a cover member, as a third embodiment of the present invention.
Figure 5:
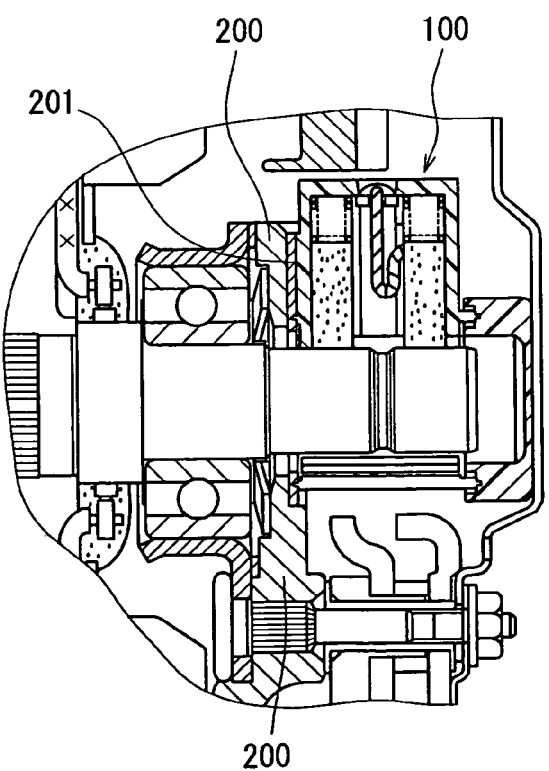
FIG. 5 is a cross-sectional view showing a conventional vibration-absorbing structure in an automotive alternator.

A third embodiment of the present invention will be described with reference to FIG. 4. In this embodiment, a reinforcing member 1024 made of a metallic material is embedded in the front disc portion 1023. Other structures are the same as those of the second embodiment described above. In this structure, not only the vibration of the brush device 5 in the axial and radial directions but also a strong vibration of the rotor 1 in the axial direction can be suppressed. It is preferable to embed the reinforcing member 1024 in the front disc portion 1023 so that it inclines relative to a vertical line, as shown in FIG. 4.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An automotive alternator comprising:

a rotor connected to a rotor shaft having slip-rings formed at a rear end thereof;

a brush device having brushes slidably contacting the slip-rings for supplying field current to the rotor;

a cover-member covering the brush device and the slip rings;

a rear bearing box holding a rear bearing that rotatably supports the rotor shaft;

a rear frame having a rear end wall positioned between a front surface of the cover member and a rear surface of the rear bearing box, the rear end wall having a center opening through which a rear end of the rotor shaft extends; and a vibration-absorbing member disposed between the rear end wall of the rear frame and the cover member, wherein:

the cover member having an extending cylindrical portion positioned in the center opening of the rear end wall, forming a cylindrical space therebetween; and the vibration-absorbing member is made of rubber and includes a cylindrical portion tightly filling the cylindrical space and a rear disc portion compressed between the front surface of the cover member and the rear end wall of the rear frame.

2. The automotive alternator as in claim 1, wherein:
the cylindrical portion of the vibration-absorbing member is compressed in the radial direction, and the rear disc portion is compressed in the axial direction.

3. The automotive alternator as in claim 1, wherein:
the vibration-absorbing member further includes a front disc portion compressed between the rear end wall of the rear frame and the rear bearing.

4. The automotive alternator as in claim 3, wherein:
the front disc portion of the vibration-absorbing member includes a reinforcing member embedded therein.

* * * * *